United States Patent [19]

Morival et al.

[11] 3,917,549

[45] Nov. 4, 1975

[54] PROCESS FOR THE POLYMERIZATION OF DODECALACTAM IN THE PRESENCE OF BORIC ACID

[75] Inventors: Genevieve Morival; Remy Hebert, both of Serquigny, France

[73] Assignee: Ato Chimie, Courbevoie, France

[22] Filed: Dec. 21, 1973

[21] Appl. No.: 427,074

Related U.S. Application Data

[63] Continuation-in-part of Ser. No. 191,475, Oct. 21, 1971.

[30] Foreign Application Priority Data

Oct. 26, 1970 France .............................. 70.38556

[52] U.S. Cl............. 260/18 N; 260/78 L; 260/78 S

[51] Int. Cl.$^2$........................................ C08G 69/16

[58] Field of Search................ 260/18 N, 78 L, 78 S

*Primary Examiner*—Eugene C. Rzucidlo
*Attorney, Agent, or Firm*—Burgess, Ryan and Wayne

[57] ABSTRACT

The present invention concerns a process for the polymerization of dodecalactam employing a boron acid, or a salt or anhydride of said acid as a catalyst. This process is carried out in two steps. In the first step, dodecalactam is polymerized at 280° to 355°C. In the second step, polymerization is completed at temperatures from 130°C to 270°C.

The polymers obtained are easy to use in the production of molded articles, sheets, tubes and pipes, by injection, extrusion or blowing.

10 Claims, No Drawings

PROCESS FOR THE POLYMERIZATION OF DODECALACTAM IN THE PRESENCE OF BORIC ACID

This application is a continuation-in-part of our co-pending application Ser. No. 191,475, filed Oct. 21, 1971.

The present invention concerns a process for the polymerization of dodecalactam employing a boron acid, or a salt or anhydride of said acid as the polymerization catalyst. The process is carried out in two steps. In the first step dodecalactam is polymerized at 280°C to 335°C. In the second step, polymerization is completed at temperatures which are at least about 130°C but below 280°C, typically at 130° to 270°C. This is a rapid procedure for obtaining a very high yield of polyamides with particularly useful properties, notably regarding molecular weight and resistance to degradation.

It is known that dodecalactam can be converted into polydodecanamide or 12 polyamide by heating it in the presence of inorganic acids such as phosphoric or hypophosphorous acid, or in the presence of organic acids such as acetic, adipic or sebacic acid. Polymerization can also be effected in the presence of small quantities of basic substances such as hexamethylene diamine.

These catalysts facilitate polymerization and speed it up by first opening the 12-carbon atom cycle, thus turning the dodecalactam into amino-dodecanoic acid. The reaction then continues by polyaddition. These catalysts, however, limit the molecular weight of the polymer, by partly blocking the free acid or amine functions of the polyamide as it forms. In addition, since they do not remain inactive in the final polymer, they usually have an adverse effect on the molecular weight of the polyamide, which shows a tendency to degradation when kept molten.

The process, according to the present invention, provides a way of obtaining, very rapidly and with a yield of more than 99%, polyamides with high molecular weight and almost no residual dodecalactam, and with excellent resistance to degradation when kept molten during processing operations such as extrusion or injection, even under humid conditions.

The present invention concerns a process for polymerizing dodecalactam in the presence of boron acids or their salts and anhydrides in two steps. In the first step, the dodecalactam monomer is polymerized by heating to a temperature of 280°C to 335°C in the presence of the selected boron catalyst. In the second step, the polymerization is completed at temperatures at least about 130°C but below 280°C. Typically, the second stage temperature can vary between 240° and 260°C; below 180°C, or between 150° to 170°C, or from 130° to 270°C.

The most commonly used boron compounds for this catalysis should be boric acids such as metaboric, orthoboric, pyroboric and tetraboric acids. The amount of catalyst is usually between 0.05 and 2% of the weight of the mixture to be polymerized, and preferably between 0.1 and 0.5%.

According to one feature of the present invention, additional catalysts may be used in conjunction with the boron compounds, so as to provide greater control over the melting viscosity of the polyamide obtained. These generally consist of mono- or dicarboxylic organic acids such as acetic, propionic, caproic, caprylic, lauric, stearic, adipic and sebacic acids and mixtures of them. Preference should be given, however, to monocarboxylic acids such as acetic acid.

Inorganic acids such as phosphoric or hypophosphorous acid may also be used as additional catalysts.

According to one embodiment of the present invention, the dodecalactam may be polymerized on its own, or mixed with other monomers which can produce polyamides. These monomer mixtures for polymerization should contain more than 50% moles of dodecalactam. The comonomers that can be used include lactams such as caprolactam, oenantholactam and capryllactam, amino-acids such as amino-caproic and amino-undecanoic acid, diacid and diamine salts such as hexamethylene diamine adipate, hexamethylene diamine sebacate and dilinoleic acid salt with diamine dimer.

During the process, the catalyst is added to the monomeric lactam, and the dodecalactam is turned into 12 polyamide, in the presence of water is necessary, at a temperature of between 280° and 335°C, typically at 290° to 320°C and at high pressure, normal pressure or even in a vacuum. It is advisable to perform the first stage of the reaction under pressure, and later reduce the pressure, in an inert gas atmosphere, such as nitrogen or carbon dioxide. The second stage may also be carried out in a vacuum, in order to remove the water vapor that forms more quickly.

The process may be performed continuously or intermittently in existing lactam polymerization apparatuses, such as tubes allowing simple continuous reaction, or in autoclaves with or without stirring devices.

Polymerization may also be performed in the presence of heat or light stabilizing agents, plasticizers, fillers, matting agents, pigments, coloring agents or other similar substances.

The length of the operation may vary depending on the degree of polymerization required, and the temperature and concentration of catalyst. It is usually between 2 and 20 hours.

The polymers obtained by means of the process according to the present invention are suitable for use in all cases requiring polyamides, particularly those with low moisture absorbency, good dielectric properties and dimensional stability, as required for toothed wheels, boxes, screws, etc. These polymers can easily be used to manufacture molded articles, sheets, tubes or pipes, by injection, blowing or extrusion. Because of the very low amount of residual monomer or other soluble substances present, sheets made from such polyamides can be used for sterile wrapping of foodstuffs.

These polymers may also be used to manufacture powders for coatings.

The present invention is illustrated by, without in any way being confined to, the following examples.

EXAMPLE 1

14 kg of dodecalactam, 420 cc of distilled water, 0.15% orthoboric acid and 0.1% acetic acid (calculated as percentages of the weight of dodecalactam) are placed in turn in a small polymerization autoclave.

The air is removed from the autoclave by draining with nitrogen, and it is tightly closed and heated to 300°C. In the first stage, the pressure is raised to 25 kg, and it is kept at this temperature and pressure for 2 hours. The pressure is gradually released over about 4 hours, until it reaches atmospheric level at which time the temperature drops from 300° to 240°C. In the second stage, a slow, uninterrupted current of nitrogen is blown over the surface of the molten mixture, and after about 45 minutes the polymer is extruded through a nozzle at the bottom of the autoclave. This polyamide is passed through cold water, to cool it, flaked and dried until the moisture content is approximately 0.04%. The amount of residual lactam is less than 0.5%. The melting viscosity is measured by means of an apparatus similar to the ASTM D 1238 melt indexer, and it is found that the quantity, heated to 240°C and extruded at a pressure of 2 kg/sq.cm, through a nozzle 3mm in diameter and 9mm long is 600 to 700 mg.

The inherent viscosity, in metacresol at 20°C, is 1.57 for a concentration of 0.5%.

To obtain a polyamide with a given melting viscosity, the polymerization time in the absence of boric acid is considerably greater as compared with the time required when the polymerization is effected in the presence of boric acid. Thus, when the reaction is carried out in the presence of boric acid as described in Example 1, at least about 45 minutes are required to obtain the 12 polyamides having the melting viscosity. In contrast, when no boric acid is used, the other operating conditions being the same, 2.5 hours are needed to obtain a 12 polyamide having the same viscosity.

Tubing is then made by extrusion, using granules of the polyamide of this example and of the polyamide without boric acid.

Both types of granules have a moisture content of 0.05%, and they are used to feed the hopper of an extruder with a nozzle for 10–14 mm tubing at the end.

It is found that, in view of the type of extruder used, average temperatures of around 220°C are needed.

Operating at identical temperatures in both cases, it is found that:

the inherent viscosity (measured in metacresol at 20°C and an 0.5% concentration) of the 12 polyamide tube made from the substance obtained in this example is 1.56, i.e. the same as that of the original granules;

the viscosity of the 12 polyamide tubing made from the comparative substance has dropped to 1.46, indicating the beginning of degradation.

EXAMPLE 2

15 kg of dodecalactam and 75g of orthoboric acid dissolved in 400 cc of water are placed in turn in a stainless steel autoclave heated by Dowtherm circulation.

In the first stage, the air is drained with nitrogen, and the autoclave is heated gradually to 300°C, over a period of 2 hours. The pressure is then 12kg. It is kept at this temperature and pressure for 5 hours, following which the substance is extruded, under slight nitrogen pressure, through a nozzle at the base of the autoclave, in the form of a liquid which is cooled and solidified by passing between two water-cooled steel cylinders. The inherent viscosity of the prepolymer is measured at 20 C in an 0.5% metacresol solution, and is found to be 0.6. The residual dodecalactam content is 0.4%.

In the second stage the prepolymer is then kept at 150°C for 8 hours, by which time the inherent viscosity of the 12 polyamide has reached 0.95.

We claim:

1. A process for the polymerization of dodecalactam which comprises a first step wherein dodecalactam is polymerized at a temperature of between 280° and 335°C, in the presence of 0.05 to 2% be weight, of a boron acid or a salt or anhydride of said acid, and a second step wherein the polymerization is completed by maintaining the polymer from the first step at temperatures from 130° to 270°C.

2. A process according to claim 1, in which the second step is carried out at temperatures from 240° to 260°C.

3. A process according to claim 1 wherein the second step is carried out at a temperature between 150° and 170°C.

4. A process according to claim 1, in which polymerization is performed in the presence of boric acid.

5. A process according to claim 4, in which the boric acid is used is orthoboric acid.

6. A process according to claim 4, in which the concentration of boric acid in the reaction mixture is between 0.1 and 0.5%.

7. A process according to claim 1, in which the temperature in the first step is between 290° and 320°C.

8. A process according to claim 1, in which polymerization is performed in the presence of an additional catalyst selected from the group consisting of acetic acid, propionic acid, caproic acid, caprylic acid, lauric acid, stearic acid, adipic acid, sebacic acid, phosphoric acid, and hypophosphorous acid and mixtures thereof.

9. A process according to claim 8, in which the additional catalyst is selected from the group consisting of adipic acid, and acetic acid.

10. A process according to claim 1, wherein the dodecalactam is polymerized in the presence of a material selected from the group consisting of caprolactam, oenantholactam, capryllactam, amino-caproic acid, amino-undecanoic acid, hexamethylene diamine sebacate, hexamethylene diamine adipate and dilinoleic acid salt and diamine dimer.

* * * * *

UNITED STATES PATENT OFFICE
CERTIFICATE OF CORRECTION

Patent No. 3,917,549    Dated November 4, 1975

Inventor(s) Genevieve Morival et al.

It is certified that error appears in the above-identified patent and that said Letters Patent are hereby corrected as shown below:

The term of this patent subsequent to July 9, 1974, has been disclaimed.

Signed and Sealed this Twenty-seventh Day of July 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,917,549          Dated November 4, 1975

Inventor(s) Genevieve Morival et al

It is certified that error appears in the above-identified patent and that said Letters Patent are hereby corrected as shown below:

The term of this patent subsequent to July 9, 1991 has been disclaimed.

This certificate supersedes Certificate of Correction issued July 27, 1976.

*Signed and Sealed this*

Nineteenth Day of October 1976

[SEAL]

Attest:

RUTH C. MASON
*Attesting Officer*

C. MARSHALL DANN
*Commissioner of Patents and Trademarks*